(12) United States Patent
Kojima et al.

(10) Patent No.: US 9,845,000 B2
(45) Date of Patent: Dec. 19, 2017

(54) GLASS RUN FOR MOTOR VEHICLES

(71) Applicant: Nishikawa Rubber Co., Ltd., Hiroshima (JP)

(72) Inventors: Masahiro Kojima, Hiroshima (JP); Kiyonori Nishihara, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 15/296,761

(22) Filed: Oct. 18, 2016

(65) Prior Publication Data

US 2017/0136861 A1    May 18, 2017

(30) Foreign Application Priority Data

Nov. 12, 2015    (JP) .................................. 2015-222193

(51) Int. Cl.

| E05D 15/16 | (2006.01) |
| B60J 10/76 | (2016.01) |
| B60J 5/04 | (2006.01) |

(52) U.S. Cl.
CPC .............. B60J 10/76 (2016.02); B60J 5/0402 (2013.01)

(58) Field of Classification Search
CPC ................................ B60J 10/76; B60J 5/0402
USPC ........................................ 49/440, 441, 495.1
See application file for complete search history.

(56) References Cited

U.S. PATENT DOCUMENTS

| 4,656,784 | A | * | 4/1987 | Brachmann | ............... | B60J 10/24 |
| | | | | | | 49/374 |
| 5,014,464 | A | * | 5/1991 | Dupuy | ..................... | B60J 10/24 |
| | | | | | | 428/122 |
| 5,414,961 | A | * | 5/1995 | Tessier | ..................... | B60J 10/16 |
| | | | | | | 49/441 |
| 5,817,414 | A | * | 10/1998 | Ando | ....................... | B60J 10/17 |
| | | | | | | 156/245 |
| 6,286,841 | B1 | * | 9/2001 | Foy | ........................ | B29C 47/003 |
| | | | | | | 277/651 |
| 6,440,492 | B1 | * | 8/2002 | Coran | ...................... | C08J 7/047 |
| | | | | | | 427/195 |
| 6,708,450 | B2 | * | 3/2004 | Tanaka | ..................... | B60J 10/17 |
| | | | | | | 49/441 |
| 7,237,359 | B2 | * | 7/2007 | Aritake | ..................... | B60J 10/27 |
| | | | | | | 49/440 |
| 7,275,782 | B2 | * | 10/2007 | Morihara | ................. | B60J 10/24 |
| | | | | | | 296/107.04 |
| 7,410,203 | B2 | * | 8/2008 | Yatsuda | ................... | B60J 10/30 |
| | | | | | | 296/146.1 |

(Continued)

FOREIGN PATENT DOCUMENTS

JP       2001-130265 A       5/2001
WO    WO 2013161446 A1 *  10/2013    ............ B60J 10/042

*Primary Examiner* — Jerry E Redman
(74) *Attorney, Agent, or Firm* — Alston & Bird LLP (57) ABSTRACT

Disclosed herein is a glass run having the ability to reduce a rattle while keeping the sliding resistance of a glass windowpane low enough. The glass run includes an exterior lip, an interior lip, and an auxiliary interior lip. A windowpane is inserted between the exterior and interior lips. A soft portion, made of a softer material than the interior lip or auxiliary interior lip, is interposed in a region where the interior lip and the auxiliary interior lip overlap with each other. The soft portion may be provided for at least one of the interior lip and auxiliary interior lip.

5 Claims, 11 Drawing Sheets

(56) References Cited

U.S. PATENT DOCUMENTS

| | | | | |
|---|---|---|---|---|
| 8,701,349 B2* | 4/2014 | Krause | ............... | B60J 10/79 49/374 |
| 8,869,456 B2* | 10/2014 | Matsuura | ............... | E06B 7/22 49/489.1 |
| 9,475,375 B1* | 10/2016 | Williams | ............... | B60J 10/33 |
| 9,694,660 B2* | 7/2017 | Kameoka | ............... | B60J 10/50 |
| 2001/0001916 A1* | 5/2001 | Nozaki | ............... | B60J 10/16 49/414 |
| 2001/0015034 A1* | 8/2001 | Omori | ............... | B60J 10/16 49/440 |
| 2002/0002796 A1* | 1/2002 | Hamada | ............... | B60J 10/16 49/441 |
| 2005/0072053 A1* | 4/2005 | Filipczak | ............... | B60J 10/79 49/490.1 |
| 2005/0198906 A1* | 9/2005 | Fujita | ............... | B60J 10/24 49/428 |
| 2005/0279026 A1* | 12/2005 | Tsuchida | ............... | B60J 10/79 49/495.1 |
| 2006/0248802 A1* | 11/2006 | Tamaoki | ............... | B60J 10/16 49/441 |
| 2007/0251152 A1* | 11/2007 | Takase | ............... | B60J 10/74 49/441 |
| 2009/0064592 A1* | 3/2009 | Takase | ............... | B60J 10/277 49/374 |
| 2009/0071077 A1* | 3/2009 | Takase | ............... | B60J 10/277 49/489.1 |
| 2011/0308170 A1* | 12/2011 | Goto | ............... | B60J 10/265 49/489.1 |
| 2013/0305612 A1* | 11/2013 | Murree | ............... | E06B 7/2314 49/483.1 |

* cited by examiner

GLASS RUN FOR MOTOR VEHICLES

CROSS-REFERENCE TO RELATED APPLICATION

This application claims priority to and the benefit of Japanese Patent Application No. 2015-222193, filed on Nov. 12, 2015, the contents of which as are incorporated by reference herein in their entirety.

BACKGROUND

Related Field

The present disclosure relates to a glass run to be mounted to a window frame of a motor vehicle door, and more particularly relates to a structure with a sealing lip to achieve a high degree of sealing by making close contact with a glass windowpane.

Description of Related Art

Figure 9:
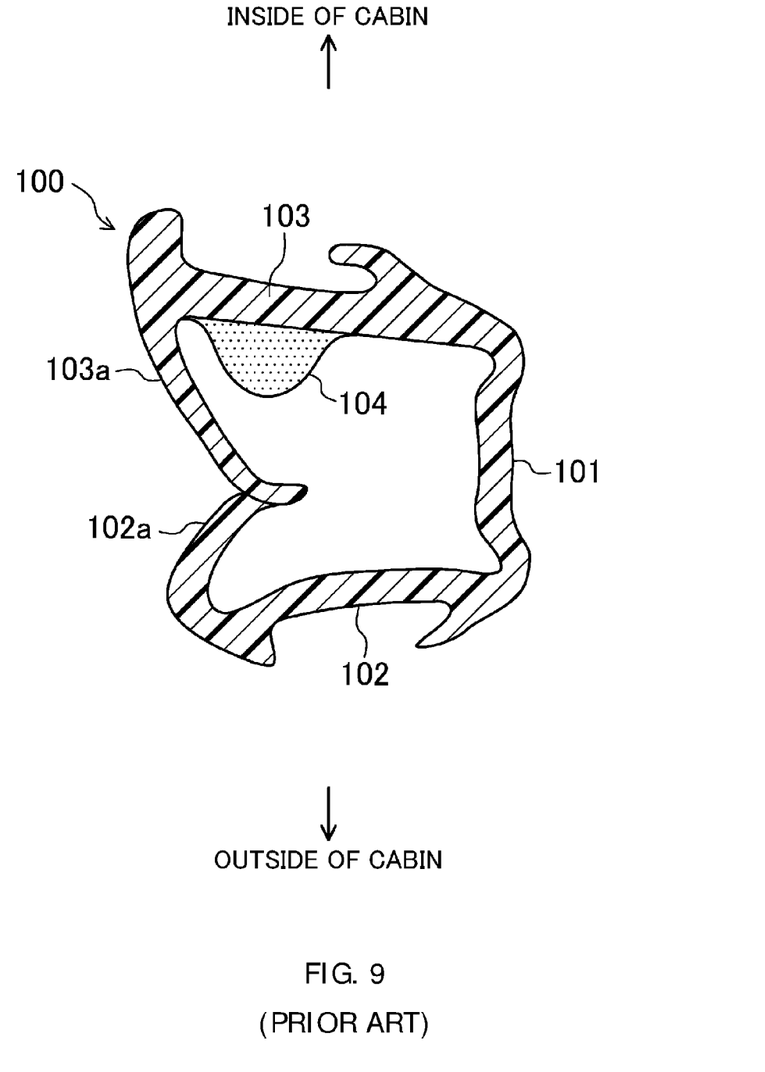
FIG. 9 is a cross-sectional view depicting a conventional glass run.

In general, if a retractable glass windowpane is mounted to a motor vehicle door, the door includes a window frame for supporting the outer periphery of the windowpane and a glass run mounted to the window frame (see, for example, Japanese Unexamined Patent Publication No. 2001-130265). As shown in FIG. 9, the glass run 100 disclosed in Japanese Unexamined Patent Publication No. 2001-130265 is formed in the shape of a channel including a base 101, an exterior wall 102, and an interior wall 103. The exterior wall 102 is provided with an exterior lip 102a, while the interior wall 103 is provided with an interior lip 103a. The interior wall 103 further includes a highly foamed sponge 104 arranged to face an inner surface of the interior lip 103a. The outer periphery of the windowpane is inserted between the exterior lip 102a and the interior lip 103a, which respectively come into contact with the outer periphery of the windowpane from outside and inside of the cabin, thereby achieving a high degree of sealing.

Depending on the situation, it is sometimes necessary to open a glass window only a little. In that case, the top of the glass windowpane is moved down from the window frame, and only the front and rear edges of the windowpane are supported by the window frame via the glass run. Thus, the windowpane may shake inward or outward (i.e., toward or away from the cabin) more easily than in a situation where the window is fully closed. If exciting force is applied in such a state in the vehicle width direction to the windowpane, for example, when the vehicle door with the windowpane is shut or when the motor vehicle is running on a rough terrain, then the windowpane shakes toward or away from the cabin. As a result, in the glass run disclosed in Japanese Unexamined Patent Publication No. 2001-130265, the interior lip 103a in contact with the windowpane also shakes in the same way. In Japanese Unexamined Patent Publication No. 2001-130265, the highly foamed sponge 104 is arranged to face the interior lip 103a. Thus, a so-called "rattle" to be produced when the interior lip 103a comes into contact with the interior wall 103 would decrease.

Nevertheless, the repulsive force of the highly foamed sponge 104 is so weak that if the windowpane is shaking at too high frequencies, then the highly foamed sponge 104 cannot keep up with the movement of the windowpane (i.e., the movement of the interior lip 103a). As a result, the interior lip 103a and the highly foamed sponge 104 come into, and out of, contact with each other quickly and repeatedly, thus sometimes producing strange noise called "contact noise." Recently, in some situations (e.g., while a vehicle powered by an electric motor such as a hybrid vehicle or an electric vehicle is running at low speeds), it may be very quiet inside the cabin. In such situations, the driver may find the contact noise so strange that some countermeasure needs to be taken to reduce the noise in one way or another.

One possible method may be increasing the size of the highly foamed sponge 104 in the vehicle width direction. In that case, the highly foamed sponge 104 may be pressed strongly against the interior lip 103a. That is why even if the windowpane is shaking at rather high frequencies, the highly foamed sponge 104 would not come out of contact with the interior lip 103a easily, and therefore, the contact noise could be reduced.

If the highly foamed sponge 104 is pressed against the interior lip 103a too hard, however, the interior lip 103a will come into contact with the windowpane so coercively that the windowpane being moved up or down may have its sliding resistance increased to the point of preventing the user from moving the windowpane up or down when the air temperature is extremely low, for example.

In view of the foregoing background, it is therefore an object of the present disclosure to reduce the rattle or contact noise while keeping the sliding resistance of the windowpane low enough.

BRIEF SUMMARY

To achieve this object, according to the present disclosure, an elastically deformable portion is provided closer to the inside of the cabin separately from the interior lip that contacts with the windowpane, and a soft portion is interposed between the elastically deformable portion and the interior lip.

A first aspect of the present disclosure is directed to a glass run for use in motor vehicles. The glass run is mounted to a window frame that supports an outer periphery of a retractable glass windowpane provided for a motor vehicle door such that the windowpane is readily moved up and down with respect to the door. The glass run includes: a glass run body including a base, an exterior sidewall extending from a portion of the base closer to outside of a cabin of the motor vehicle, and an interior sidewall extending from another portion of the base closer to inside of the cabin; an exterior lip extending from the exterior sidewall of the glass run body toward the inside of the cabin so as to approach the base, and coming into contact with an outer surface of the windowpane facing the outside of the cabin; an interior lip extending from the interior sidewall of the glass run body toward the outside of the cabin so as to approach the base, and coming into contact with an inner surface of the windowpane facing the inside of the cabin; and an elastically deformable portion protruding from the interior sidewall of the glass run body, and arranged to face an inner surface of the interior lip that faces the inside of the cabin so as to be elastically deformable toward or away from the cabin.

In this glass run, a soft portion, made of a softer material than the interior lip or the elastically deformable portion, is interposed between the interior lip and the elastically deformable portion so as to be located in a region where the interior lip overlaps with the elastically deformable portion when viewed in a vehicle width direction in a state where the windowpane is inserted between the exterior lip and the interior lip.

According to this configuration, in a state where the window is closed, the windowpane is inserted between the exterior lip and the interior lip, which respectively come into contact with two surfaces of the windowpane that face the outside and inside of the cabin, thereby achieving a high degree of sealing. Also, at the moment the door is just closed or if the motor vehicle is running on a rough terrain with the window opened only a little, the windowpane shakes toward and away from the cabin, thus causing the interior lip to shake toward and away from the cabin as well. However, as the interior lip shakes, the elastically deformable portion also shakes accordingly, and gets deformed elastically toward or away from the cabin. As a result, the rattle may be reduced. Furthermore, a soft portion is interposed between the interior lip and the elastically deformable portion. Thus, even if the windowpane is shaking at rather high frequencies, the intervention of the soft portion may reduce the contact noise to be produced between the interior lip and the elastically deformable portion. Consequently, even if the repulsive force produced by the elastically deformable portion is not intensified significantly, the rattle or contact noise may still be reducible to the point of keeping the sliding resistance of the windowpane low enough.

A second aspect of the present disclosure is an exemplary embodiment of the first aspect of the present disclosure. In the second aspect, the elastically deformable portion may be configured as a lip protruding from the interior sidewall of the glass run body toward the outside of the cabin and extending obliquely with respect to the interior sidewall, and the soft portion may form an integral part of the elastically deformable portion.

According to this configuration, the elastically deformable portion is configured as a lip extending obliquely with respect to the interior sidewall, and therefore, is significantly deformable with reliability toward and away from the cabin. Thus, even if the amplitude of shake of the windowpane is rather large, the elastically deformable portion may also be deformed so as to track that large amplitude. In addition, the soft portion forms an integral part of the elastically deformable portion, and does not slip through the gap between the interior lip and the elastically deformable portion. This allows the soft portion to reduce the contact noise sufficiently effectively.

A third aspect of the present disclosure is another exemplary embodiment of the first aspect of the present disclosure. In the third aspect, the soft portion may form an integral part of the inner surface of the interior lip that faces the inside of the cabin.

According to this configuration, the soft portion does not slip through the gap between the interior lip and the elastically deformable portion, either. This allows the soft portion to reduce the contact noise sufficiently effectively as well.

A fourth aspect of the present disclosure is an exemplary embodiment of the second aspect of the present disclosure. In the fourth aspect, the soft portion may be provided for only a tip end portion of the elastically deformable portion in its protruding direction.

According to this configuration, in a state where the windowpane is inserted between the exterior lip and the interior lip, the tip end portion of the elastically deformable portion in its protruding direction comes closest to the interior lip. Since the soft portion is provided for only the tip end portion of the elastically deformable portion, the contact noise may be reduced sufficiently effectively with the soft portion provided in only a minimum required area.

A fifth aspect of the present disclosure is an exemplary embodiment of the second aspect of the present disclosure. In the fifth aspect, the inner surface of the interior lip that faces the inside of the cabin may function as a contact surface to contact with the soft portion, and the contact surface may be curved toward the outside of the cabin.

According to this configuration, the soft portion may be brought into contact with the interior lip with reliability so as not to slip through the gap between the interior lip and the elastically deformable portion.

According to the first aspect of the present disclosure, the interior sidewall of the glass run body is provided with an elastically deformable portion which is arranged to face an inner surface of the interior lip that faces the inside of the cabin and to be deformed elastically toward or away from the cabin, and a soft portion is interposed between the interior lip and the elastically deformable portion. Thus, the rattle and the contact noise may be reduced with the sliding resistance of the windowpane kept low.

According to the second aspect of the present disclosure, the elastically deformable portion is configured as a lip extending obliquely with respect to the interior sidewall of the glass run body. Thus, even if the amplitude of shake of the windowpane is rather large, the elastically deformable portion may also be deformed so as to track that large amplitude. In addition, the soft portion forms an integral part of the elastically deformable portion, and does not slip through the gap between the interior lip and the elastically deformable portion. This allows the soft portion to reduce the contact noise sufficiently effectively.

According to the third aspect of the present disclosure, the soft portion forms an integral part of the inner surface of the interior lip that faces the inside of the cabin, and therefore, does not slip through the gap between the interior lip and the elastically deformable portion, either. This allows the soft portion to reduce the contact noise sufficiently effectively as well.

According to the fourth aspect of the present disclosure, the soft portion is provided for only a tip end portion of the elastically deformable portion in its protruding direction. Thus, the contact noise may be reduced sufficiently effectively with the soft portion provided in only a minimum required area.

According to the fifth aspect of the present disclosure, the contact surface to contact with the soft portion is curved, and therefore, the soft portion may be arranged with reliability between the interior lip and the elastically deformable portion.

DETAILED DESCRIPTION OF VARIOUS EMBODIMENTS

Embodiments of the present disclosure will now be described in detail with reference to the accompanying drawings. Note that the following description of embodiments is only an example in nature and is not intended to limit the scope, application, or uses of the present disclosure.

Door Structure

Figure 1:
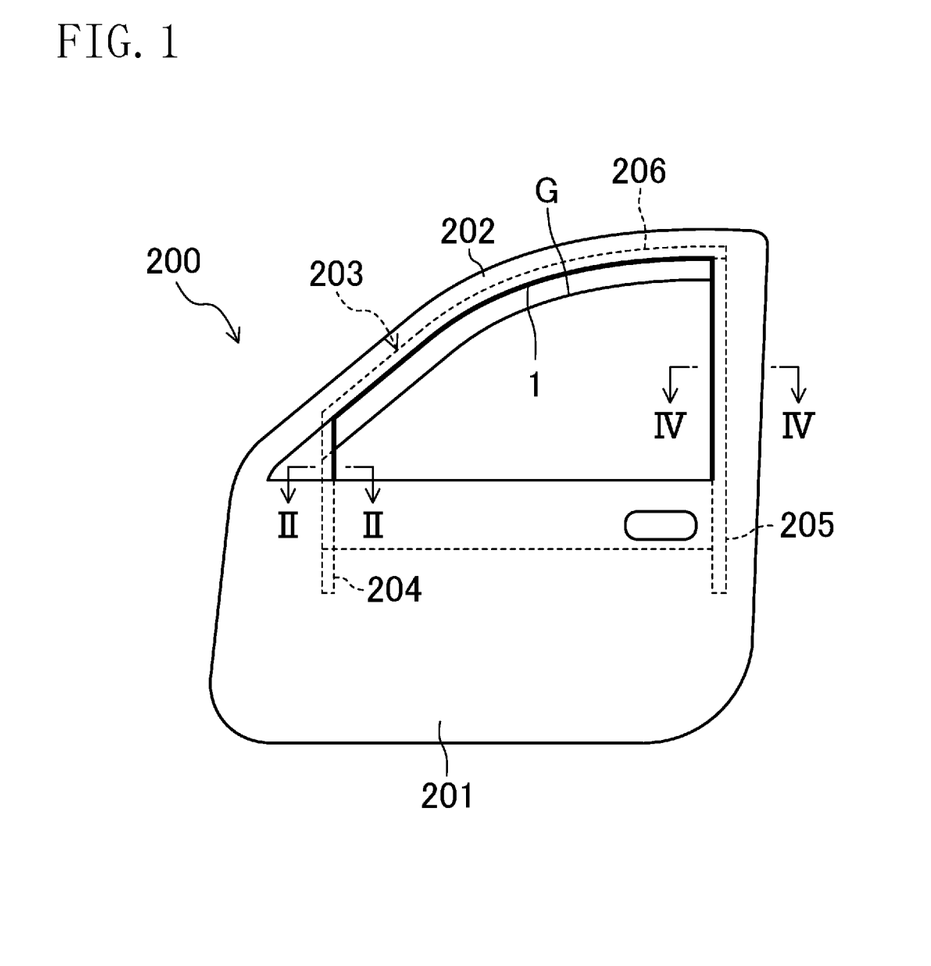
FIG. 1 is a side view depicting a motor vehicle door including a glass run according to an exemplary embodiment.

FIG. 1 is a side view of a door 200 including a glass run 1 for motor vehicles according to an exemplary embodiment of the present disclosure as viewed from outside of the cabin. The door 200 is mounted to one side of a motor vehicle (not shown) in order to open and close the entrance (not shown) provided at the front end of that side of the motor vehicle. In the following description of embodiments, the front side of the motor vehicle will be hereinafter simply referred to as "front," and the rear side thereof "rear."

The door 200 includes a door body 201 forming approximately the lower half of the door 200, and a window frame 202 forming approximately the upper half of the door 200. A retractable windowpane G is mounted to this door 200 so as to be readily moved up and down. Although not shown, the front end of the door body 201 is mounted to the vehicle body via a hinge with a vertically extending shaft. A window regulator (not shown) for moving the windowpane G up and down is housed inside the door body 201. When moved down, the windowpane G is open and housed inside the door body 201.

In the following description of embodiments, the present disclosure is supposed to be applied to the door 200 mounted to the front of a motor vehicle. However, the present disclosure is also applicable to a rear door (not shown) or a sliding door (not shown, either). That is to say, the present disclosure is applicable to any motor vehicle door as long as the door includes a windowpane to be moved up and down. Thus, the following description of embodiments is only an example of the present disclosure.

Figure 2:
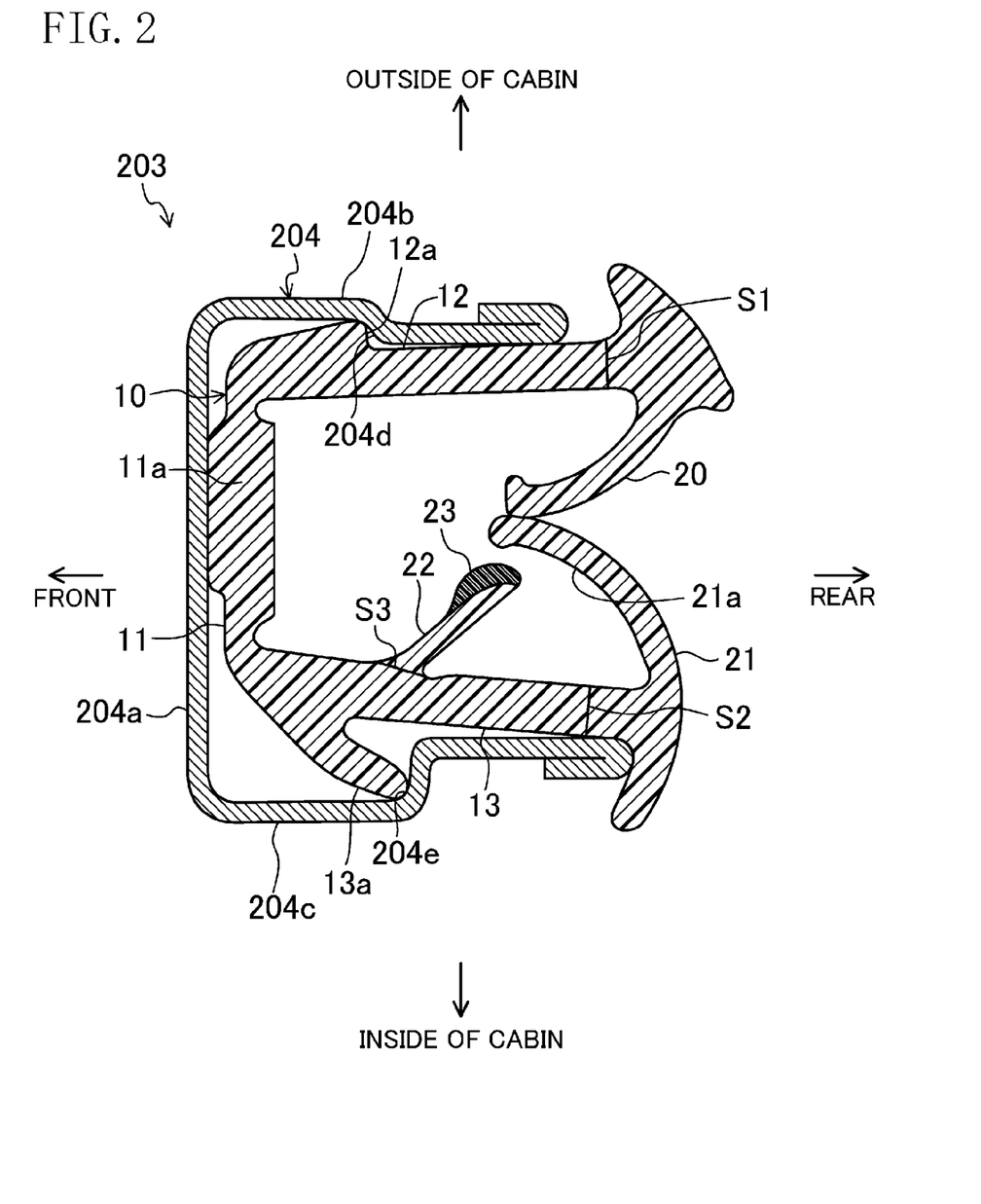
FIG. 2 is a cross-sectional view of the glass run taken along the plane II-II shown in FIG. 1 and illustrating a state where a glass windowpane is not inserted into the glass run.
Figure 4:
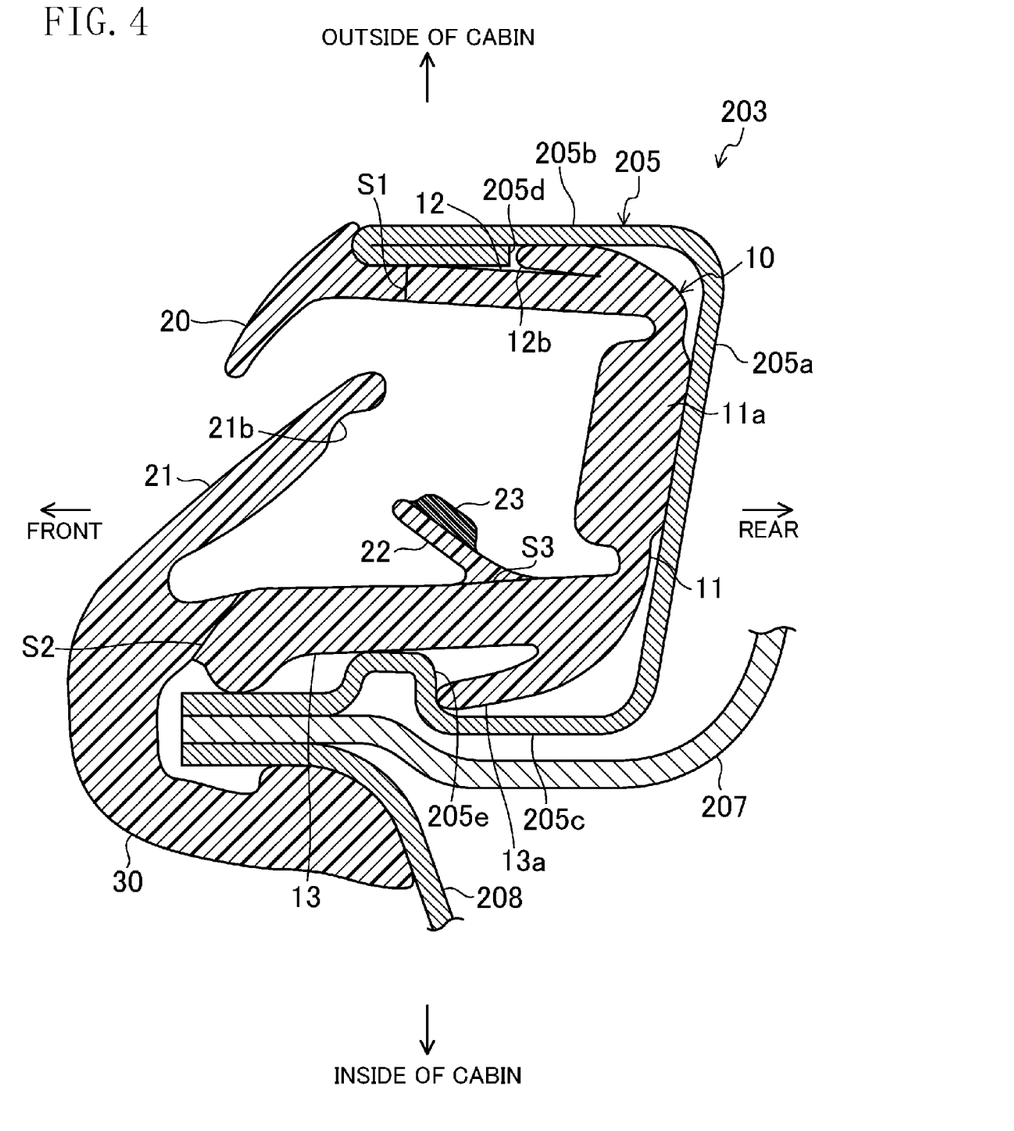
FIG. 4 is a cross-sectional view of the glass run taken along the plane IV-IV shown in FIG. 1 and illustrating a state where a glass windowpane is not inserted into the glass run.

The window frame 202 is formed in the shape of a frame functioning as a window sash that supports the outer periphery of the windowpane G. In this exemplary embodiment, the window frame 202 is configured as a combination of a channel member 203, a first panel member 207, and a second panel member 208, each of which is obtained by pressing a steel plate, as shown in FIGS. 2 and 4 and other drawings. Specifically, the window frame 202 may be formed by roll forming, for example.

As shown in FIG. 1, the channel member 203 includes a front side portion 204, a rear side portion 205, and an upper side portion 206. The front side portion 204 extends vertically at the front end of the door 200, and its cross section is opened backward. The rear side portion 205 extends vertically at the rear end of the door 200, and its cross section is opened forward. The respective bottoms of the front and rear side portions 204, 205 are inserted into the cavity inside the door body 201. These front and rear side portions 204, 205 are configured to guide the windowpane G into the cavity inside the door body 201 when the windowpane G is moved down. The upper side portion 206 extends from the top of the front side portion 204 through the top of the rear side portion 205, and has an upwardly curved shape corresponding to the shape of the door frame 202 such that its top rises toward the rear end of the door 200.

Figure 3:
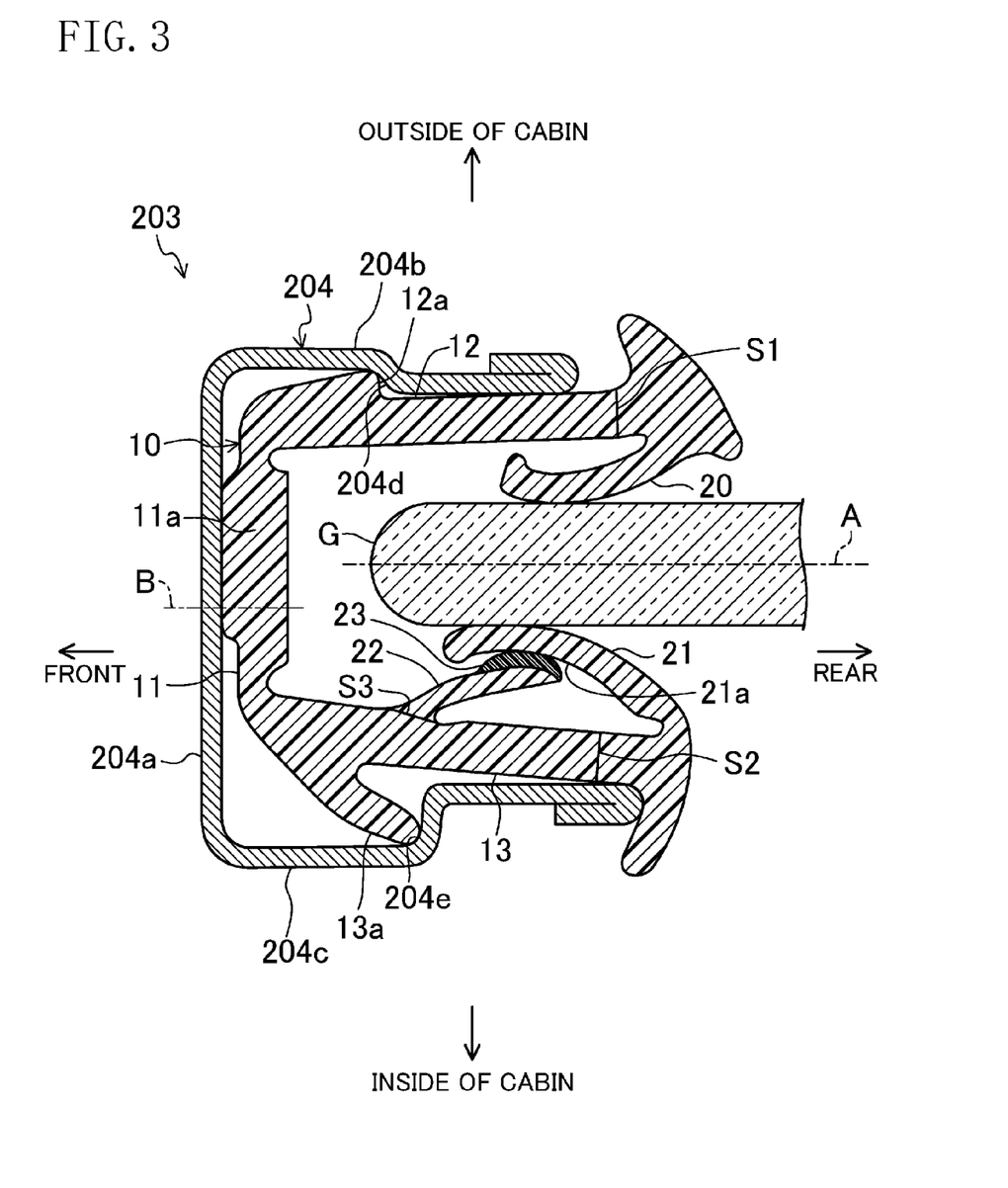
FIG. 3 is a cross-sectional view corresponding to FIG. 2 and illustrating a state where the windowpane has been inserted into the glass run.
Figure 5:
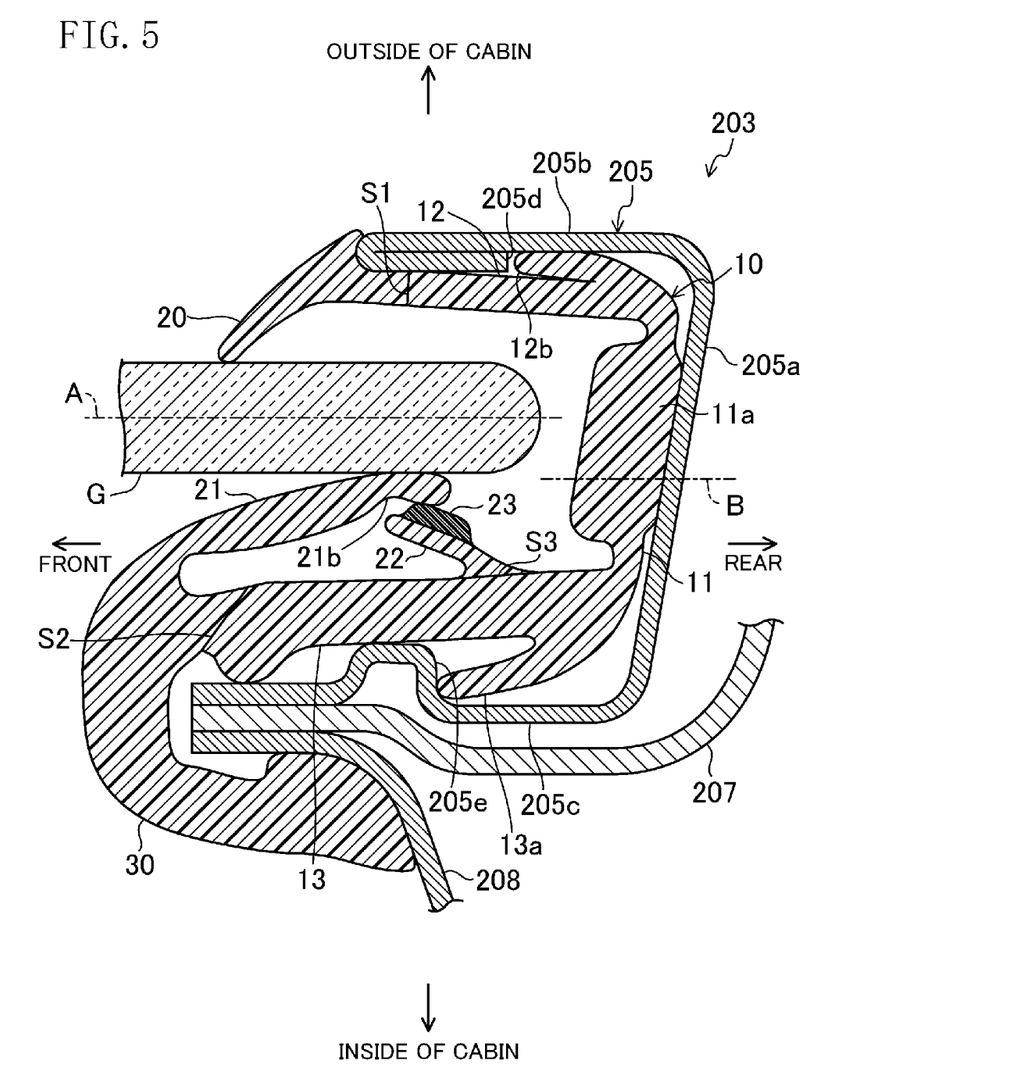
FIG. 5 is a cross-sectional view corresponding to FIG. 4 and illustrating a state where the windowpane has been inserted into the glass run.

When the window is fully closed, an upper portion of the windowpane G is inserted into the upper side portion 206 and supported by the upper side portion 206 via a glass run 1. Meanwhile, front and rear portions of the windowpane G are respectively inserted into the front and rear side portions 204, 205, and supported by the front and rear side portions 204, 205 via the glass run 1. If the window is opened just a little as shown in FIG. 1, the upper portion of the windowpane G is out of contact with the upper side portion 206, while the front and rear portions of the windowpane G are respectively inserted into the front and rear side portions 204, 205, and supported by the front and rear side portions 204, 205 via the glass run 1 as shown in FIGS. 3 and 5.

As shown in FIG. 2, the front side portion 204 of the channel member 203 includes a substrate 204a extending in the vehicle width direction, an outer wall 204b extending backward from a portion of the substrate 204a closer to the outside of the cabin, and an inner wall 204c extending backward from another portion of the substrate 204a closer to the inside of the cabin. The outer wall 204b has an outer step 204d halfway in the vehicle length direction such that a half of the outer wall 204b behind the outer step 204d is located closer to the inside of the cabin than the other half of the outer wall 204b ahead of the outer step 204d. The inner wall 204c has an inner step 204e halfway in the vehicle length direction such that a half of the inner wall 204c behind the inner step 204e is located closer to the outside of the cabin than the other half of the inner wall 204c ahead of the inner step 204e.

As shown in FIG. 4, the rear side portion 205 of the channel member 203 includes a substrate 205a extending in the vehicle width direction, an outer wall 205b extending forward from a portion of the substrate 205a closer to the outside of the cabin, and an inner wall 205c extending forward from another portion of the substrate 205a closer to the inside of the cabin. A front portion of the outer wall 205b is folded toward the inside of the cabin, thereby forming a step 205d on an inner surface of the outer wall 205b. The inner wall 205c has a protrusion 205e halfway in the vehicle length direction. The protrusion 205e protrudes toward the outside of the cabin. Inside (i.e., closer to the cabin than) the inner wall 205c of the rear side portion 205, the first and second panel members 207 and 208 are welded together while being partially superposed one upon the other.

Configuration of Glass Run

The glass run 1 is attached to the channel member 203 such that most of the glass run 1 is housed inside the channel member 203. That is to say, the glass run 1 is mounted to the window frame 202 via the channel member 203.

The glass run 1 is formed to run as a whole from the front side portion 204 of the channel member 203 and along the upper side portion 206 and rear side portion 205 thereof. Respective portions of the glass run 1 running along the front side portion 204, upper side portion 206, and rear side portion 205 may be extruded portions except for their boundary portions. On the other hand, the boundary portion between respective portions of the glass run 1 running along the front and upper side portions 204 and 206, and the boundary portion between respective portions of the glass run 1 running along the upper and rear side portions 206 and 205 may be die-molded portions. The glass run 1 may be made of an elastic material such as a thermoplastic elastomer or rubber, for example, and has its hardness and material changed depending on the site as will be described later.

As shown in FIGS. 2 and 4, the respective portions (extruded portions) of the glass run 1 running along the front and rear side portions 204 and 205 have different cross-sectional shapes, but have almost the same fundamental configuration. Specifically, the glass run 1 includes a glass run body 10, an exterior lip 20 functioning as an outer sealing lip, an interior lip 21 functioning as an inner sealing lip, an auxiliary interior lip 22 functioning as an elastically deformable portion, and a soft portion 23. As shown in FIG. 4, the portion of the glass run 1 running along the rear side portion 205 further includes a cover portion 30.

As shown in FIG. 2, in the portion of the glass run 1 running along the front side portion 204, the glass run body 10 includes a base 11, an exterior sidewall 12 extending from a portion of the base 11 closer to the outside of the cabin, and an interior sidewall 13 extending from another portion of the base 11 closer to inside of the cabin. The base 11 extends in the vehicle width direction and along the substrate 204a of the front side portion 204. The base 11 has a thicker portion 11a, which is in contact with the substrate 204a of the front side portion 204. The exterior sidewall 12 extends along the outer wall 204b of the front side portion 204 to reach a point closer to the rear end of the vehicle than the outer wall 204b does. The outer surface of the exterior sidewall 12 that faces the outside of the cabin has a protrusion 12a, which engages with the outer step 204d of the outer wall 204b of the channel member 203. The interior sidewall 13 extends along the inner wall 204c of the front side portion 204. The inner surface of the interior sidewall 13 that faces the inside of the cabin has a latching lip 13a, which engages with the inner step 204e of the inner wall 204c of the channel member 203.

The exterior lip 20 has been formed to form an integral part of the rear end of the exterior sidewall 12 of the glass run body 10, and extends inward (i.e., toward the inside of the cabin) from the rear end so as to approach the base 11. As shown in FIG. 3, mostly a tip end portion of the exterior lip 20 contacts with the outer surface of the windowpane G that faces the outside of the cabin. The exterior lip 20 is gently curved as a whole so as to go forward as the point of interest moves toward the inside of the cabin.

On the other hand, the interior lip 21 has been formed to form an integral part of the rear end of the interior sidewall 13 of the glass run body 10, and extends outward (i.e., toward the outside of the cabin) from the rear end so as to approach the base 11. As shown in FIG. 3, mostly a tip end portion of the interior lip 21 contacts with the inner surface of the windowpane G that faces the inside of the cabin. The interior lip 21 is gently curved as a whole so as to go forward as the point of interest moves toward the outside of the cabin. As shown in FIG. 2, in a state where the glass run 1 is attached to the channel member 203, in the portion of the glass run 1 running along the front side portion 204, respective tip ends of the interior and exterior lips 20 and 21 are in contact with each other.

The auxiliary interior lip 22 protrudes from the interior sidewall 13 of the glass run body 10 toward the outside of the cabin so as to face an inner surface of the interior lip 21 that faces the inside of the cabin. Also, the auxiliary interior lip 22 is arranged closer to the inside of the cabin than the tip end of the interior lip 21 is, so as to be elastically deformable toward and away from the cabin. The auxiliary interior lip 22 is configured as a tilted lip tilted with respect to the interior sidewall 13 such that the lip 22 goes backward as the point of interest moves toward the outside of the cabin. As shown in FIG. 2, in a state where the glass run 1 is attached to the channel member 203, the tip end of the auxiliary interior lip 22 is out of contact with, and located closer to the inside of the cabin than, the tip end of the interior lip 21.

As shown in FIG. 3, the soft portion 23 is interposed between the interior lip 21 and the auxiliary interior lip 22 so as to be located in a region where the interior lip 21 overlaps with the auxiliary interior lip 22 when viewed in the vehicle width direction in a state where the windowpane G is inserted between the exterior lip 20 and the interior lip 21. The soft portion 23 is made of a softer material than the material of the interior lip 21 or the auxiliary interior lip 22.

Specifically, most of the glass run body 10, located closer to the front end of the vehicle than the boundary lines S1 and S2 shown in FIG. 2 are, is made of a solid material of styrene thermoplastic elastomer (TPS). This portion may have a hardness of 74 when the hardness is measured with a Type A durometer JIS K6253. This portion suitably has a hardness of 70-80, for example, when the hardness is measured with the Type A durometer JIS K6253. As used herein, the "solid material" refers to a material with no foams. Optionally, such a solid material of styrene thermoplastic elastomer may be replaced with a solid or foamed material of any of various other types of thermoplastic elastomers or rubber.

On the other hand, portions located closer to the rear end of the vehicle than the boundary lines S1 and S2 are, namely, the exterior lip 20, the interior lip 21, and the rear ends of the glass run body 10, are made of a solid material of olefin thermoplastic elastomer (TPO). These portions may have a hardness of 67 when the hardness is measured with the Type A durometer JIS K6253. The portion located closer to the outside of the cabin than the boundary line S3 is, namely, the auxiliary interior lip 22, is also made of the solid material of olefin thermoplastic elastomer (TPO). This portion is suitably softer than the portions made of the solid material of styrene thermoplastic elastomer, and suitably has a hardness of 60-70, for example, when the hardness is measured with the Type A durometer JIS K6253. Optionally, such a solid material of olefin thermoplastic elastomer may be replaced with a solid or foamed material of any of various other types of thermoplastic elastomers or rubber.

Meanwhile, the soft portion 23 may be made of a foamed material of styrene thermoplastic elastomer and has a sufficiently high foam ratio (i.e., foam content) such that its specific gravity is 0.3. This makes the soft portion 23 softer than the solid material of styrene thermoplastic elastomer or the solid material of olefin thermoplastic elastomer without losing its elasticity. The specific gravity of the soft portion 23 is suitably set to be 0.05-0.4. With its specific gravity set within this range, the soft portion 23 may be made of a sufficiently softer material than the material of the interior lip 21 or auxiliary interior lip 22 is. This reduces the contact noise to be produced between the soft portion 23 and the interior lip 21 as will be described later.

Note that the soft portion 23 does not have to be made of a foamed material as long as its material is sufficiently soft. For example, the soft portion 23 may be made of a solid material (non-foamed material) of olefin thermoplastic elastomer (TPO), of which the hardness is 10-30 when measured with the Type A durometer JIS 6253.

In this embodiment, the soft portion 23 is provided for only a tip end portion of the auxiliary interior lip 22 in its protruding direction. More specifically, the soft portion 23 covers a portion of the auxiliary interior lip 22 from around its middle through its tip end in the protruding direction. The soft portion 23 is extruded while the auxiliary interior lip 22 is extruded (i.e., these portions 22 and 23 are coextruded), and forms an integral part of the auxiliary interior lip 22. The soft portion 23 suitably has a maximum thickness of 0.5 mm to 1.0 mm.

The inner surface of the interior lip 21 that faces the inside of the cabin functions as a contact surface 21a with which the soft portion 23 contacts in a state where the windowpane G is inserted between the exterior and interior lips 20 and 21 as shown in FIG. 3. The contact surface 21a is curved toward the outside of the cabin.

As shown in FIG. 4, the portion of the glass run body 10 running along the rear side portion 205 of the channel member 203 includes, just like the portion of the glass run body 10 running along the front side portion 204 shown in FIG. 2, a base 11, an exterior sidewall 12, and an interior sidewall 13. The base 11 extends along the substrate 205a of the rear side portion 205. The base 11 has a thicker portion 11a, which is in contact with the substrate 205a of the rear side portion 205. The exterior sidewall 12 extends along the outer wall 205b of the rear side portion 205, and has its latching lip 12b engaged with the step 205d of the outer wall 205b of the channel member 203. The interior sidewall 13 extends along the inner wall 205c of the rear side portion 205, and has its latching lip 13a engaged with the protrusion 205e of the inner wall 205c.

The exterior lip 20 comes into contact with the outer surface of the windowpane G that faces the outside of the cabin as shown in FIG. 5. The interior lip 21 extends straight and obliquely toward the rear end of the vehicle to come into contact with the inner surface of the windowpane G that faces the inside of the cabin. As shown in FIG. 4, in a state where the glass run 1 is attached to the channel member 203, in the portion of the glass run 1 extending along the rear side portion 205, the respective tip ends of the exterior and interior lips 20 and 21 are out of contact with each other. In addition, the interior lip 21 also has a recess 21b around the tip end thereof in the protruding direction. The soft portion 23 is formed to be raised from the auxiliary interior lip 22. As shown in FIG. 5, at least part of the soft portion 23 contacts with at least part of the recess 21b.

As shown in FIG. 4, the cover portion 30 is formed to cover a junction between the rear side portion 205 and the first and second panel members 207 and 208, and to reach a surface of the second panel member 208 that faces the inside of the cabin.

Note that no soft portion 23 is provided for a portion of the glass run 1 running along the upper side portion 206 of the channel member 203.

Advantages of Embodiments

Next, some advantages of the glass run 1 with such a configuration will be described. When the window is fully closed, the windowpane G is inserted between the exterior and interior lips 20 and 21 of the glass run 1 as shown in FIGS. 3 and 5 to bring the exterior and interior lips 20 and 21 into contact with the outer and inner surfaces on the periphery of the windowpane G that respectively face the outside and inside of the cabin, thereby achieving a high degree of sealing. At this time, the inner surface of the interior lip 21 that faces the inside of the cabin comes into contact with the soft portion 23 and presses the soft portion 23 toward the inside of the cabin. As a result, the auxiliary interior lip 22 is elastically deformed toward the inside of the cabin.

Also, if the window is opened only a little, the upper portion of the windowpane G is no longer supported by the channel member 203 as shown in FIG. 1, which allows the windowpane G to shake easily toward, and away from, the cabin. At the moment the door 200 is just closed, or if the motor vehicle is running on a rough terrain, in such a state, the windowpane G shakes toward, and away from, the cabin. As the windowpane G shakes toward, and away from, the cabin, the exterior and interior lips 20 and 21 in contact with the windowpane G also shake accordingly so as to follow the windowpane G shaking, because these lips 20 and 21 are made of an elastic material.

In this case, while the windowpane G is at its rest position, the middle A of the thickness thereof is located closer to the outside of the cabin than the middle B of the thickness of the channel member 203 in the vehicle width direction is as shown in FIGS. 3 and 5. This configuration is adopted to provide a flushest possible surface by decreasing, as much as possible, the level difference at the boundary between the respective outer surfaces of the windowpane G and window frame 202 that face the outside of the cabin. Since the windowpane G is shifted toward the outside of the cabin in this manner, a shake of the windowpane G from its rest position toward the outside or inside of the cabin causes the interior lip 21 to shake toward or away from the cabin more significantly than the exterior lip 20 does.

At this time, the interior lip 21 is pressing the auxiliary interior lip 22 toward the inside of the cabin. Also, since the auxiliary interior lip 22 is made of an elastic material, the auxiliary interior lip 22 is elastically deformable toward or away from the cabin as the interior lip 21 shakes. As a result, the rattle may be reduced. Furthermore, the soft portion 23 is interposed between the interior lip 21 and the auxiliary interior lip 22. Thus, even if the windowpane G shakes at rather high frequencies, the intervention of the soft portion 23 may reduce the contact noise to be produced between the interior lip 21 and the auxiliary interior lip 22. Consequently, even if the repulsive force produced by the auxiliary interior lip 22 is not intensified significantly, the rattle or contact noise may still be reducible as described above to the point of keeping the sliding resistance of the windowpane G low enough.

Moreover, the soft portion 23 forms an integral part of the auxiliary interior lip 22, and therefore, does not slip through the gap between the interior lip 21 and the auxiliary interior lip 22 while the auxiliary interior lip 22 is shaking. This allows the soft portion 23 to reduce the contact noise sufficiently effectively as well.

Furthermore, the soft portion 23 is provided in only a minimum required area in which the exterior lip 20 and the interior lip 21 can avoid direct contact with each other. Thus, the contact noise may be reduced sufficiently effectively with the soft portion 23 provided in only a minimum required area.

EXAMPLES

Examples of the present disclosure will now be described with reference to the accompanying drawings.

Rattle Test

First, a rattle test will be described. The rattle test was carried out in the following manner. Specifically, a sample door with the configuration shown in FIG. 1 was provided, exciting force was applied from a known shaker (not shown) to its glass windowpane, and the sound generated then was picked up with a microphone (not shown). In a specific example of the present disclosure, the glass run had a cross section such as the ones shown in FIGS. 3 and 5. The windowpane had a thickness of 4 mm, an amplitude of 3 mm, and a frequency of 20 Hz. The excitation point was set approximately at the center of the windowpane.

Figure 10:
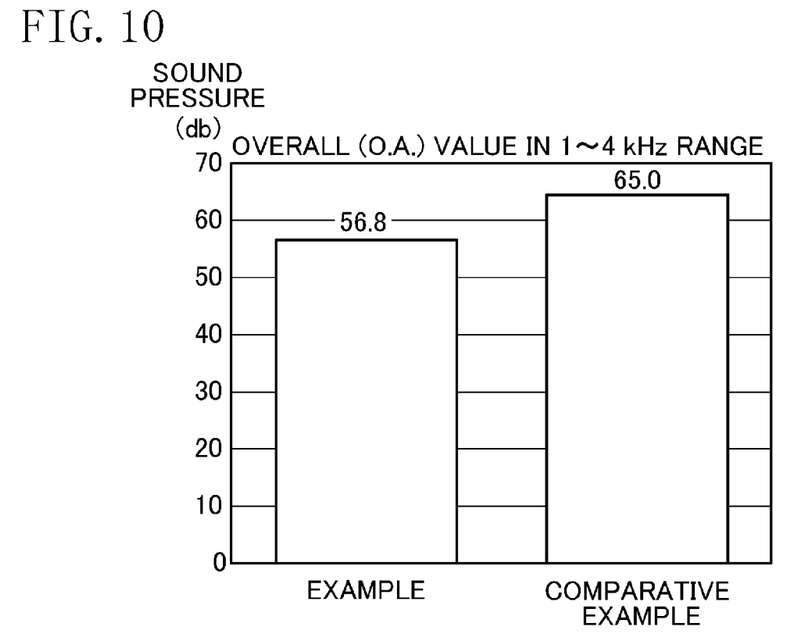
FIG. 10 is a graph showing the sound pressures of a rattle in the vicinity of the cross section shown in FIG. 3.
Figure 11:
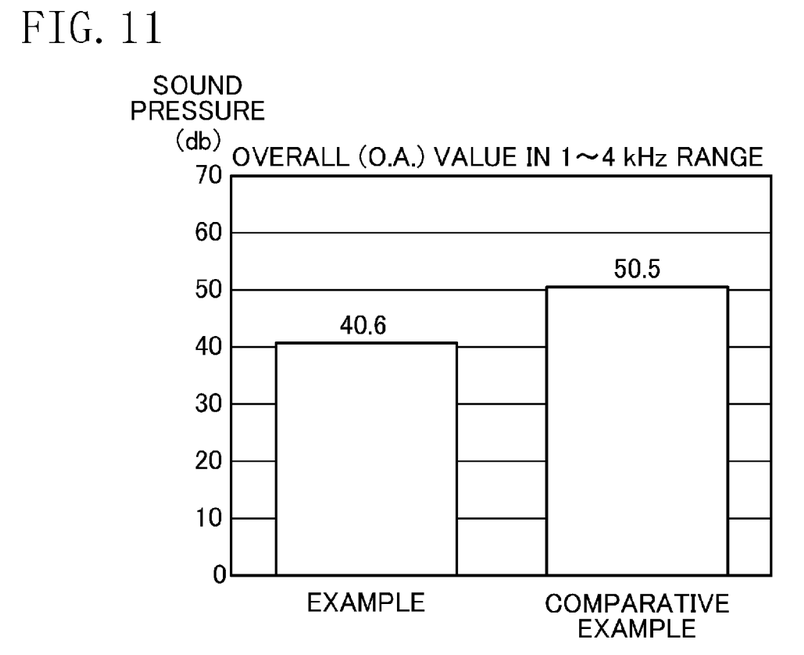
FIG. 11 is a graph showing the sound pressures of a rattle in the vicinity of the cross section shown in FIG. 5.

FIG. 10 shows the sound pressures measured around the cross section shown in FIG. 3. The sound pressure was as low as 56.8 dB in a specific example of the present disclosure, but was as high as 65.0 dB in a comparative example. Note that in the comparative example, the glass run basically had the cross-sectional shape shown in FIGS. 2 and 4, but included no soft portion. FIG. 11 shows the sound pressures measured around the cross section shown in FIG. 5. The sound pressure was as low as 40.6 dB in the specific example of the present disclosure, but was as high as 50.5 dB in the comparative example. Thus, it can be seen that in the specific example of the present disclosure, the rattles (including contact noise) could be reduced considerably in the vicinity of both A and B pillars.

Figure 12:
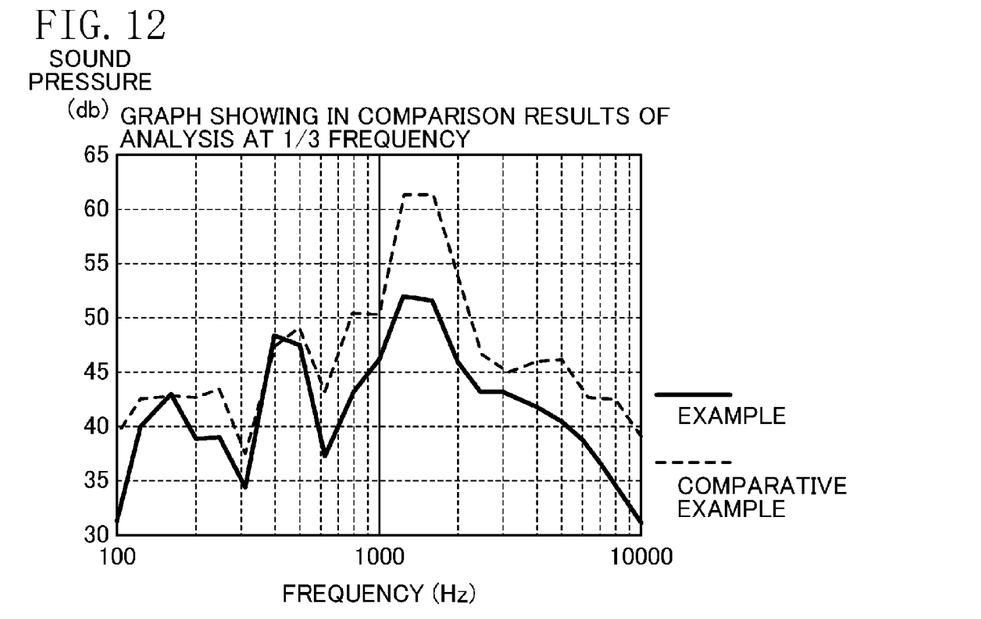
FIG. 12 is a graph showing how the sound pressure of a rattle changes with its frequency in the vicinity of the cross section shown in FIG. 3.
Figure 13:
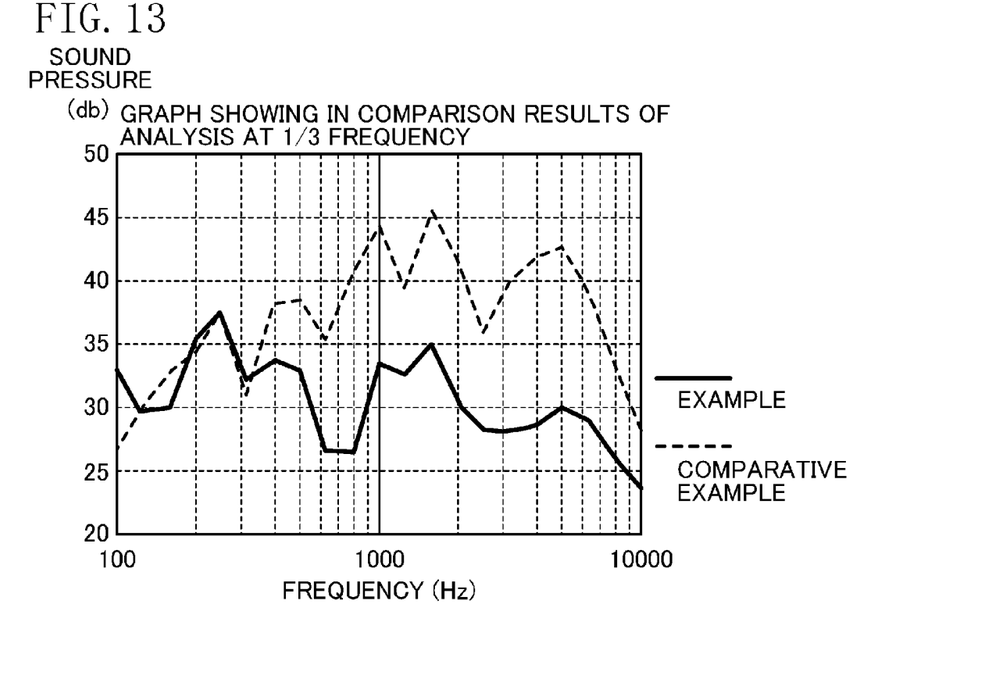
FIG. 13 is a graph showing how the sound pressure of a rattle changes with its frequency in the vicinity of the cross section shown in FIG. 5.

FIG. 12 shows how the sound pressure changed with the frequency in the vicinity of the cross section shown in FIG. 3. In the specific example of the present disclosure, the sound pressure was lower than in the comparative example in a broad spectrum of measuring frequencies. The sound pressure could be reduced particularly significantly in the frequency range of 1000-2000 Hz, which easily catches the occupant's ears. FIG. 13 shows how the sound pressure changed with the frequency in the vicinity of the cross section shown in FIG. 5. In the specific example of the present disclosure, the sound pressure was lower than in the comparative example in a broad spectrum of measuring frequencies. It can be seen that the sound pressure could be reduced particularly significantly in a frequency range exceeding 400 Hz.

Other Embodiments

Figure 6:
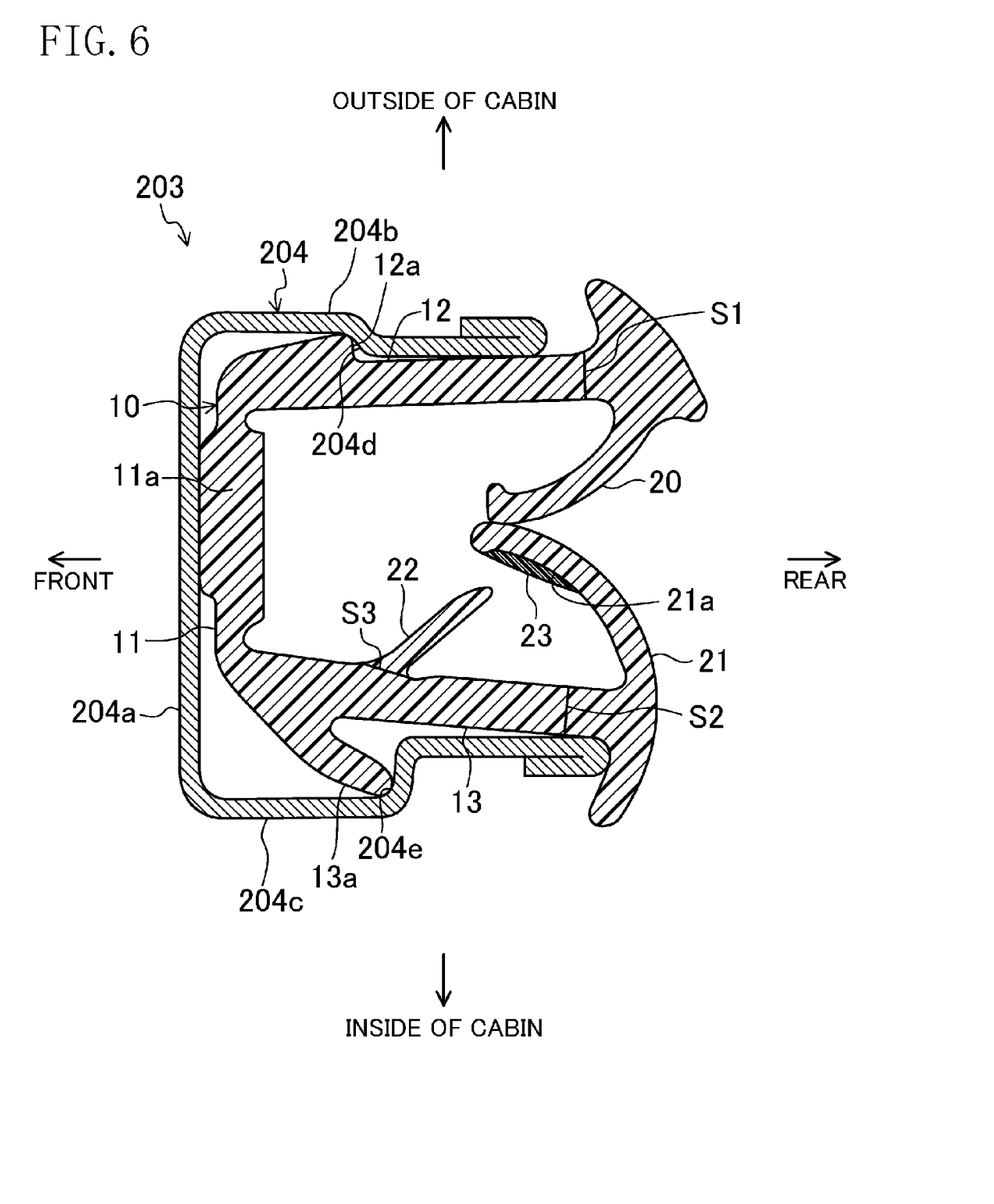
FIG. 6 is a cross-sectional view corresponding to FIG. 2 and illustrating a first variation of the exemplary embodiment shown in FIG. 2.

In the embodiments described above, the soft portion 23 is provided for the auxiliary interior lip 22. However, this is only a non-limiting exemplary embodiment. Alternatively, as in a first variation shown in FIG. 6, for example, the soft portion 23 may also form an integral part of the inner surface (i.e., the contact surface 21a) of the interior lip 21 that faces the inside of the cabin. Optionally, although not shown, the soft portion 23 may also be provided for both of the auxiliary interior lip 22 and interior lip 21.

Figure 7:
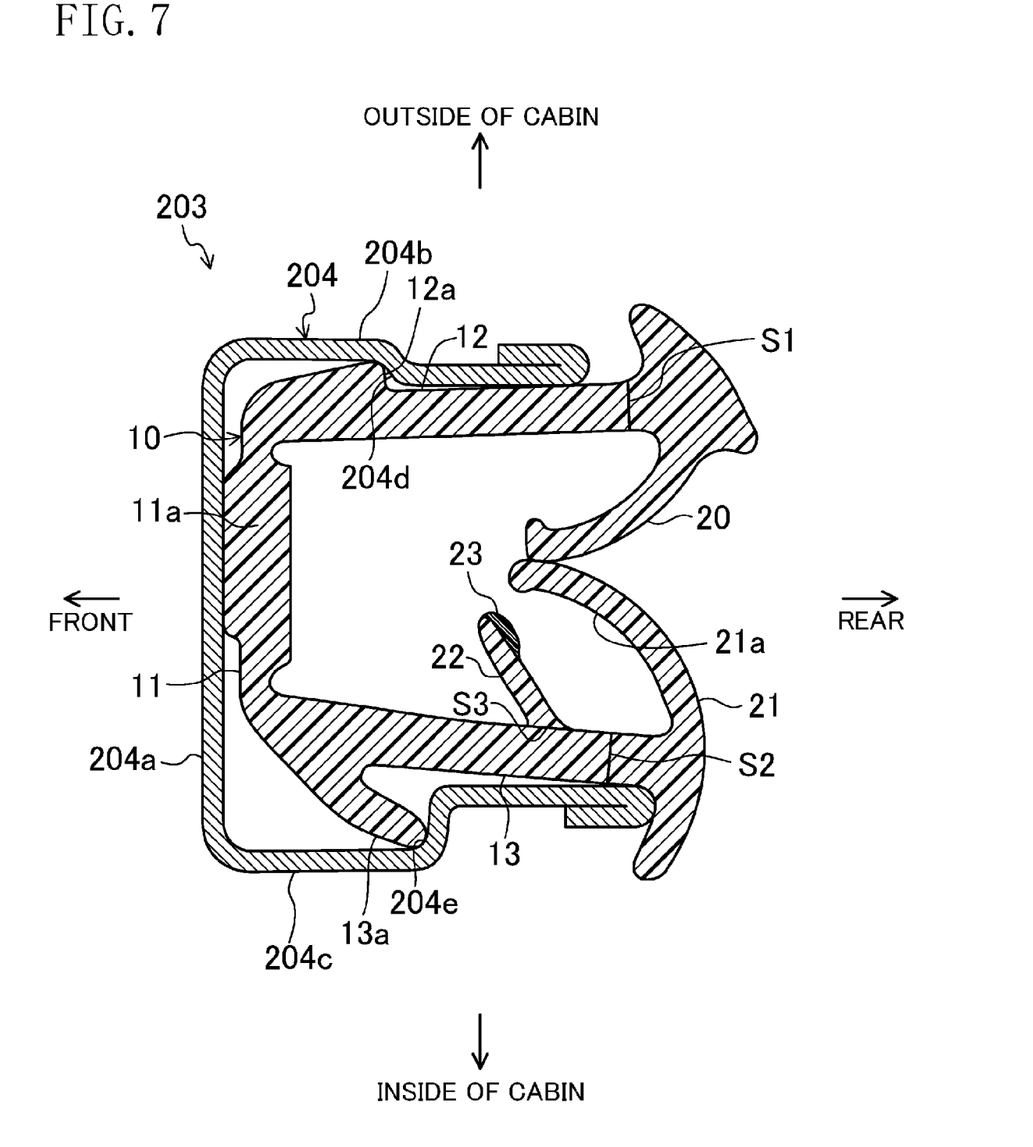
FIG. 7 is a cross-sectional view corresponding to FIG. 2 and illustrating a second variation of the exemplary embodiment shown in FIG. 2.

Still alternatively, as in a second variation shown in FIG. 7, for example, the auxiliary interior lip 22 may also be tilted to the opposite direction, i.e., to approach the base 11 as the point of interest moves toward the outside of the cabin. Even in such a variation, the soft portion 23 may also be provided for the auxiliary interior lip 22.

Figure 8:
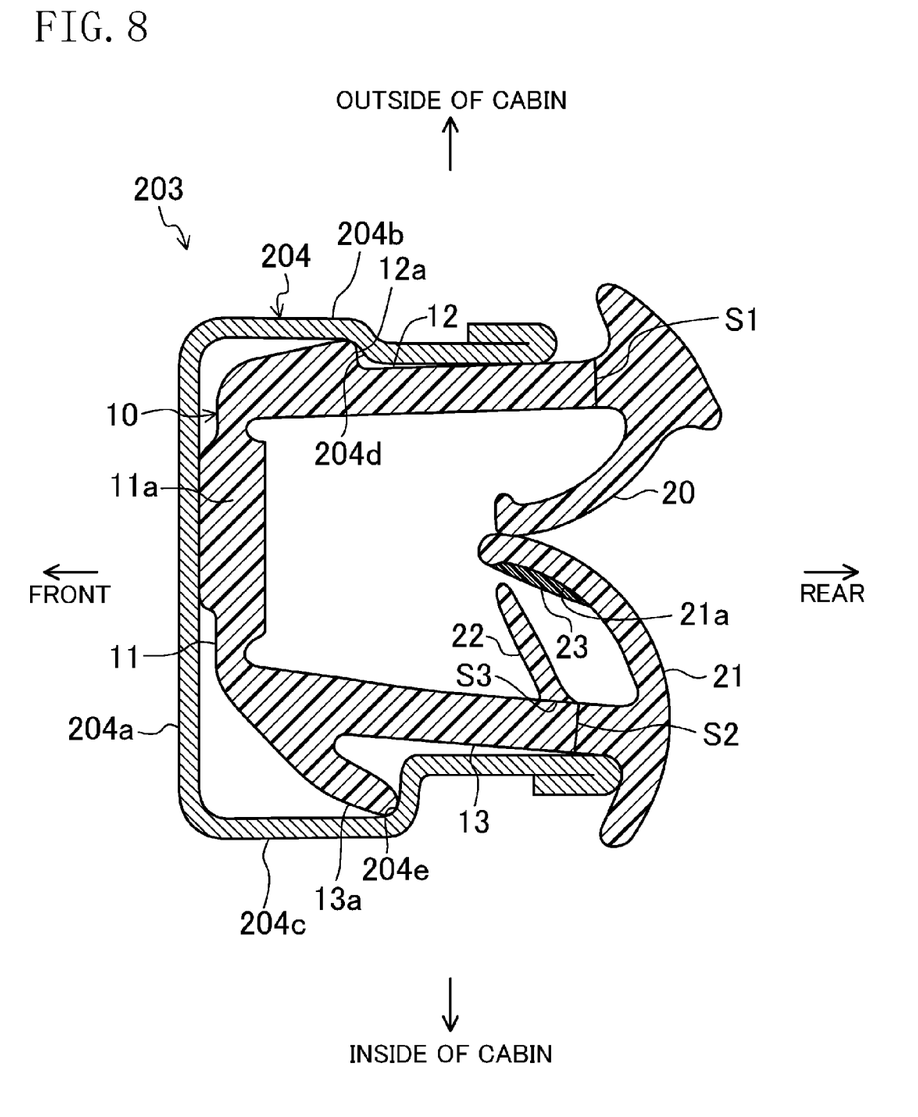
FIG. 8 is a cross-sectional view corresponding to FIG. 2 and illustrating a third variation of the exemplary embodiment shown in FIG. 2.

Yet alternatively, as in a third variation shown in FIG. 8, for example, in such a situation where the auxiliary interior lip 22 is tilted to approach the base 11 as the point of interest moves toward the outside of the cabin, the soft portion 23 may be provided for the inner surface (i.e., the contact surface 21a) of the interior lip 21 that faces the inside of the cabin. Optionally, although not shown, the soft portion 23 may be provided for both of the auxiliary interior lip 22 and interior lip 21 as in the second and third variations.

Note that each and every embodiment described above is just an example in any respect and should not be construed to be a limiting one. Besides, any variations or modifications falling within the range of equivalents to the claims to be described below are all encompassed within the scope of the present disclosure.

As can be seen from the foregoing description, a glass run for motor vehicles according to the present disclosure is applicable, for example, to a door with a retractable glass windowpane provided for a side portion of a motor vehicle.

What is claimed is:

1. A glass run for use in motor vehicles, the glass run being mounted to a window frame that supports an outer periphery of a retractable glass windowpane provided for a motor vehicle door such that the windowpane is readily moved up and down with respect to the door, the glass run comprising:
   a glass run body including a base, an exterior sidewall extending from a portion of the base closer to outside of a cabin of the motor vehicle, and an interior sidewall extending from another portion of the base closer to inside of the cabin;
   an exterior lip extending from the exterior sidewall of the glass run body toward the inside of the cabin so as to approach the base, and coming into contact with an outer surface of the windowpane facing the outside of the cabin;
   an interior lip extending from the interior sidewall of the glass run body toward the outside of the cabin so as to approach the base, and coming into contact with an inner surface of the windowpane facing the inside of the cabin; and
   an elastically deformable portion protruding from the interior sidewall of the glass run body, and arranged to face an inner surface of the interior lip that faces the inside of the cabin so as to be elastically deformable toward or away from the cabin,
   wherein a portion, made of a material that is softer than a material of the interior lip or the elastically deformable portion, is interposed between the interior lip and the elastically deformable portion so as to be located in a region where the interior lip overlaps with the elastically deformable portion when viewed in a vehicle width direction in a state where the windowpane is inserted between the exterior lip and the interior lip.

2. The glass run of claim 1, wherein:
   the elastically deformable portion is configured as a lip protruding from the interior sidewall of the glass run body toward the outside of the cabin and extending obliquely with respect to the interior sidewall, and
   the portion forms an integral part of the elastically deformable portion.

3. The glass run of claim 2, wherein the portion is provided for only a tip end portion of the elastically deformable portion in a its protruding direction.

4. The glass run of claim 2, wherein:
   the inner surface of the interior lip that faces the inside of the cabin functions as a contact surface to contact with the portion, and the contact surface is curved toward the outside of the cabin.

5. The glass run of claim 1, wherein the portion forms an integral part of the inner surface of the interior lip that faces the inside of the cabin.

* * * * *